March 19, 1935. E. W. B. GILL 1,995,175
ELECTRICAL OSCILLATION GENERATOR
Filed June 8, 1932
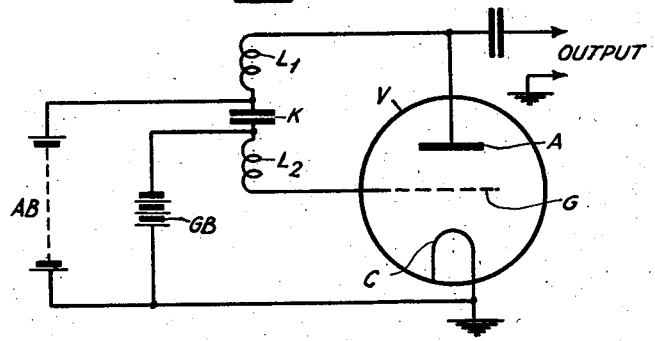
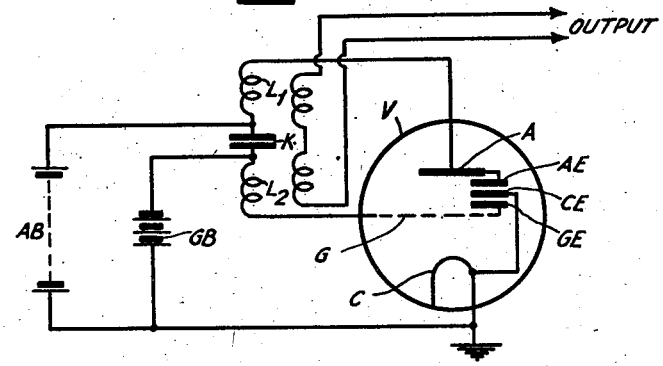
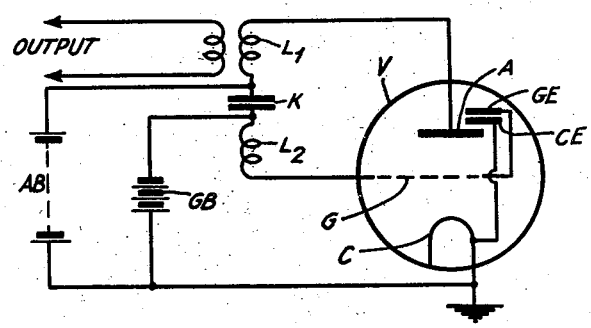
INVENTOR
E. W. B. GILL
BY
ATTORNEY Patented Mar. 19, 1935

1,995,175

UNITED STATES PATENT OFFICE 1,995,175

ELECTRICAL OSCILLATION GENERATOR

Ernest Walter Brudenell Gill, Merton College, Oxford, England, assignor to Radio Corporation of America, a corporation of Delaware Application June 8, 1932, Serial No. 616,046
In Great Britain June 12, 1931

3 Claims. (Cl. 250—36)

This invention relates to electrical oscillation generators and more particularly to thermionic oscillation generators for the generation of very short waves.

A well known short wave thermionic valve oscillation generator circuit is illustrated diagrammatically in the accompanying Figure 1 wherein there is shown a thermionic valve V whose anode A is connected to its grid G through a pair of equal inductances $L_1$ $L_2$ joined together in series through a comparatively large capacity K, the inductances $L_1$ $L_2$ of course being connected to the anode A and grid G respectively, and the condenser K being so large as to be virtually a short circuit and serving merely as a blocking condenser enabling the application of anode potential and grid bias potential to the anode and grid respectively. The anode battery AB is connected to the anode side of this condenser and the grid bias battery GB to the grid side of the said condenser, the other terminals of the two batteries being connected to the cathode C. The capacity in the oscillatory circuit of this oscillation generator is the grid anode self-capacity of the valve, together with the distributed capacities of the inductances, and for satisfactory generation of oscillations the distribution of alternating current potential should be such that as regards alternating current potential the cathode (which is connected to the blocking condenser) should, like the said blocking condenser, be at zero or nodal potential, the plate and grid respectively being at anti-nodal potentials. Except where very short waves are in question, this requirement is in practice satisfied with sufficient accuracy, but with very short wave working it is found that the cathode does not remain at nodal potential.

The factors determining the alternating current potentials of the cathode may be set forth as follows:

1. The capacity coupling between cathode and grid.
2. The capacity coupling between cathode and anode.
3. The galvanic coupling from the cathode to the nodal point.
4. Stray electro-motive forces induced by the short wave oscillations in the cathode leads, and so forth.

Of these factors, factor No. 2 is so small as compared with factor No. 1 that it can be neglected while factor No. 4 may be substantially eliminated by means of suitable chokes in the leads. If the length of the lead from the cathode to the nodal point is short compared to the wave length of the oscillation generated, factor No. 3 will be the determining factor and will maintain the cathode at zero or nodal potential; when, however, really short waves of the order of a meter or less are in question, the inductance and capacity of the lead from the cathode to the nodal point (including as it does cathode leads within the valve) tend to prevent the cathode from remaining at zero or nodal potential, with the result that the said cathode tends to follow the variations of grid potential due to capacity coupling between grid and cathode.

The principal object of the present invention is to obviate these difficulties and to provide an oscillation generator suitable for use on very short waves and in which the cathode shall be maintained at substantially zero or nodal alternating current potential. This object is achieved by providing small auxiliary capacities within the valve and utilizing the potential distribution therein to maintain the cathode at the required potential.

Referring to the drawing, Figure 1 illustrates a well known type of oscillation generator circuit, Figure 2 shows an arrangement embodying the principles of the present invention, and Figure 3 shows a modification thereof.

In one way of carrying out the invention illustrated diagrammatically in Figure 2 of the accompanying drawing, the circuit arrangement above described is modified by providing within the valve three small metal electrodes AE, GE and CE which are directly electrically connected by as short leads as practicable to the anode, grid, and cathode respectively. These electrodes are so arranged and spaced that the capacity between AE connected to the anode and CE connected to the cathode is equal to the capacity between GE connected to the grid and CE connected to the cathode and, therefore, by virtue of the potential distribution between these condenser electrodes, when the valve is oscillating the cathode will be maintained at zero or nodal potential with respect to the anode and grid.

In a preferred modification illustrated in Figure 3 of the accompanying drawing a separate condenser electrode AE electrically connected to the anode is dispensed with, the anode itself constituting the condenser electrode, i. e., there are provided two small condenser electrodes, one CE connected to the cathode and the other GE to the grid, the former condenser electrode CE being positioned between the back of the anode A and the latter condenser electrode GE, the spacing being such that the capacity GE—CE equals the capacity CE—A.

It will, of course, be appreciated that the present invention involves a slight increase in the effective valve capacity, but the increase in capacity need not be large and this disadvantage is therefore not serious. In practice, in an arrangement in which the anode forms one of the condenser electrodes, the other two electrodes have been each constituted by a plate about 2 cms. square, the three condenser electrodes (one being the anode) being spaced from one another by about 5 mm.

It will be evident, also, that the circuits shown in the drawing may be used in either receiving or transmitting arrangements, and that, if desired, various forms of modulation schemes may be associated therewith.

I claim:

1. An oscillation generator circuit comprising an electron discharge device having a cathode, anode and grid within an envelope, three auxiliary electrodes also within said envelope the first being connected to the anode, the second to the grid and the third to the cathode, the capacity between the electrode connected to the anode and that connected to the cathode being equal to the capacity between that connected to the cathode and that connected to the grid.

2. A short wave oscillation generator circuit comprising an electron discharge device having an anode, cathode and control grid contained within a single envelope, a condenser arranged within said envelope and associated with said anode, cathode and grid, said cathode being connected to one electrode of said condenser, the other electrode of which is connected to said control grid, said condenser being so spaced that the capacity between said one electrode and said anode is equal to the capacity between the two electrodes of said condenser.

3. A short wave oscillation generator circuit comprising an electron discharge device having within an envelope, an anode, cathode and control grid, a small condenser within said envelope, one electrode of said condenser being connected to said cathode, said one electrode being electrostatically coupled to said anode, and another electrode of said condenser being connected to said control grid.

ERNEST WALTER BRUDENELL GILL.